United States Patent
Filizola et al.

(10) Patent No.: US 7,995,988 B2
(45) Date of Patent: Aug. 9, 2011

(54) SYSTEM AND METHOD FOR IDENTIFYING THE POSITION OF MOBILE TERMINALS

(75) Inventors: Davide Filizola, Turin (IT); Loris Stola, Turin (IT)

(73) Assignee: Telecom Italia S.p.A., Milan (IT)

( * ) Notice: Subject to any disclaimer, the term of this patent is extended or adjusted under 35 U.S.C. 154(b) by 1128 days.

(21) Appl. No.: 10/496,633

(22) PCT Filed: Nov. 25, 2002

(86) PCT No.: PCT/EP02/13226
§ 371 (c)(1), (2), (4) Date: May 21, 2004

(87) PCT Pub. No.: WO03/049479
PCT Pub. Date: Jun. 12, 2003

(65) Prior Publication Data
US 2005/0119007 A1    Jun. 2, 2005

(30) Foreign Application Priority Data
Dec. 3, 2001 (IT) .................................. TO01A1125

(51) Int. Cl.
*H04M 11/04* (2006.01)

(52) U.S. Cl. ............... 455/404.2; 455/414.1; 455/414.2; 455/414.4; 455/456.1; 455/456.5; 342/464; 342/463; 342/465; 342/457

(58) Field of Classification Search ............... 455/456.1, 455/456.2, 456.3, 456.5, 456.6, 517–525, 455/558, 414.1, 414.2, 414.3, 414.4, 404.2
See application file for complete search history.

(56) References Cited

U.S. PATENT DOCUMENTS

| | | | | |
|---|---|---|---|---|
| 5,960,341 | A | * | 9/1999 | LeBlanc et al. ............ 455/426.1 |
| 6,052,597 | A | | 4/2000 | Ekstrom |
| 6,167,274 | A | | 12/2000 | Smith |
| 6,269,247 | B1 | * | 7/2001 | Chiodini .................... 455/456.2 |
| 6,671,377 | B1 | * | 12/2003 | Havinis et al. ............ 455/456.1 |
| 6,771,970 | B1 | | 8/2004 | Dan |

(Continued)

FOREIGN PATENT DOCUMENTS
WO    WO 98/15149    4/1998
(Continued)

OTHER PUBLICATIONS
Database Correction Method . . . by H. Laitinen et al. (IEEE May 2001).
Performance Benchmarking for Wireless . . . by S. Tekinay et al., (IEEE Apr. 1998).

*Primary Examiner* — Charles N Appiah
*Assistant Examiner* — Randy Peaches
(74) *Attorney, Agent, or Firm* — Finnegan, Henderson, Farabow, Garrett & Dunner, LLP

(57) ABSTRACT

The present invention relates to a system 10 and corresponding method for locating mobile terminals 12 following a location request whereto is associated information whose content depends on the position and characteristics of the mobile terminal 12 to be located. The system 10 comprises a cellular phone location centre (MLC centre) 15 able to locate the mobile terminals 12, in selective fashion, as the type and reliability of the received information vary. The system 10 and corresponding method allow, by means of the MLC centre 15, to select, among a plurality of location engines, a determined engine suited to manage the received information and selectively to identify both the position of the mobile terminal 12 and accuracy indicators relating to the type of locating operation performed.

15 Claims, 4 Drawing Sheets

U.S. PATENT DOCUMENTS

| | | | |
|---|---|---|---|
| 7,187,997 B2 * | 3/2007 | Johnson | 700/245 |
| 7,764,231 B1 * | 7/2010 | Karr et al. | 342/457 |
| 2003/0054837 A1 * | 3/2003 | Ennis | 455/456 |
| 2003/0146871 A1 * | 8/2003 | Karr et al. | 342/457 |

FOREIGN PATENT DOCUMENTS

| | | |
|---|---|---|
| WO | WO 99/46949 | 9/1999 |
| WO | WO 00/18148 | 3/2000 |
| WO | WO 01/28272 | 4/2001 |

* cited by examiner

SYSTEM AND METHOD FOR IDENTIFYING THE POSITION OF MOBILE TERMINALS

CROSS REFERENCE TO RELATED APPLICATIONS

This application is the US national phase of PCT application PCT/EP02/13226, filed 25 Nov. 2002, published 12 Jun. 2003 as WO 03/049479, and claiming the priority of Italian patent application TO2001A001125 itself filed 3 Dec. 2001.

FIELD OF THE INVENTION

The present invention relates to a system and method for identifying the position of mobile terminals, for instance cellular telephones to be located as a result of a locating request originating from the same mobile terminal or from a service center or from an authorised operator.

In particular, the present invention relates to a system and method for identifying, within a territory served by a mobile telephony network, the position of a mobile terminal.

BACKGROUND OF THE INVENTION

Many systems and methods for locating mobile terminals are known in the art. A common feature of such systems, and corresponding locating methods, is to exploit parameters or characteristics that are intrinsic to cellular communications constituted, for instance:
  by an identifier of the base radio station which is able to exchange information with the mobile terminal (serving stations),
  by electromagnetic field values measured by the mobile terminal,
  by delay parameters measured by the serving station when exchanging information with the mobile terminal, in order to determine the location of the mobile terminal.

For instance, known systems and corresponding methods provide for a reference station (known as Mobile Location center) appropriately connected to the mobile network to identify, following a location request by a user or an authorised operator, the position of the mobile terminal based on predefined network parameters, for instance radio frequency power levels, TA (Time Advance), etc. coming from the mobile terminals themselves and/or from the serving station.

Among known methods, for instance, one can list the one described in the international publication N. WO0018148 in which the Radio Frequency (RF) information collected from the cellular phone (RF fingerprints or RF measurements of the cellular phone) are compared with RF information, contained in a reference database (reference RF fingerprints) and associated in bi-univocal fashion to elementary areas or pixels of the territory served by the network, and in which the location is performed assigning to the cellular phone the position corresponding to the reference RF fingerprint having the closest values to those measured by the mobile terminal.

A typical problem of known systems and methods is linked to the fact that the parameters necessary for location are available in a sure manner only during actual communications (busy state) between terminal and network, whilst they are not available in the case of absence of communications (idle state).

Because of this fact the locating operation, to be reliable, should be carried out only under conditions of busy state, since the parameters are reliable only under such conditions; however, this entails two additional problems.

First of all, since the parameters necessary for the locating operation, in the case of busy state, are available in sure fashion only at the stations or equipment belonging to the mobile networks, the retrieval of such information would require on each occasion specific interfaces between the reference station and the network equipment; as is well known, the management of the parameters necessary for the locating operation is different from one manufacturer of network equipment and the next.

Secondly, performing the locating operation under conditions of busy state would entail the occupation of precious network resources which, as is obvious, are preferably used to handle voice and/or data telephone traffic.

To overcome the problems described above, known locating systems are structured in such a way as to obtain the parameters necessary for the locating operation under idle state conditions.

However, this entails another problem, for although the parameters under idle state conditions can be retrieved from the mobile terminals without wasting precious network resources, such parameters, as is well known, are partial and generally transmitted in a manner that is partial and depends on the characteristics of the terminal so that the location thus obtained is substantially unreliable.

Moreover, known systems perform the locating operation under idle state conditions, assuming that the parameters necessary for the reference station to identify the position of the mobile terminals are always present and reliable, as if they were parameters obtained under busy state conditions.

Unfortunately in practice this is not true, so the locating operation conducted under idle state conditions generally yields results that only appear to be realistic.

In some cases, for instance, the mobile terminals present in the served area have mutually different characteristics, in terms of performance and quality, so the parameters necessary for the locating operations are made available to the reference station in a manner that depends on the characteristics of the terminal but, due to the intrinsic rigidity of such systems, they are processed in uniform fashion.

In this case, in accordance with the prior art, the locating operation yields more or less accurate results, as the characteristics of the mobile terminals change, but it is impossible for the user or for the operator to determine the situations of greater or lesser precision.

In other cases, the reference station has reference information that are not completely updated, for instance in regard to the characteristics of the base radio station, such as transmitted power, type of antennas, type of equipment, assigned frequencies, so that the locating operation conducted on the basis of reference information that are neither updated nor verified leads, due to the rigidity of the tools used, to completely wrong and unreliable results.

In this case, too, it is impossible for the user or the operator to determine the quality of the results obtained, since known locating tools do not allow to verify the characteristics of the reference information used.

OBJECT OF THE INVENTION

The aim of the present invention is to provide a system and method for identifying the position of mobile terminals which, though it can operate under idle state conditions, is flexible and automatically adapts both to the characteristics of the mobile terminals to be located and to the reliability of the parameters available at the time the locating operation is conducted.

In particular, the aim of the present invention is a system and method that adapts to the reliability of the parameters available on each occasion, both when it depends on the characteristics of the mobile terminals and on the reference information.

SUMMARY OF THE INVENTION

The aim is achieved by the system and corresponding method for identifying the position of movable terminals wherein the reference center has validating modules able to selectively check and validate the information and locating modules able to be selectively activated to identify the position of the mobile terminals on the basis of the validated information.

In particular, the aim is achieved by the system and corresponding method according to the invention in which the locating operation is carried out with means that are mutually diversified according to the type of parameters available at the time the mobile terminal locating operation is conducted.

According to another characteristic of the present invention, the system and corresponding method are able to provide in addition to locating indications also parameters relating to the reliability or accuracy of the locating operation, depending on each occasion on the locating means and parameters used.

BRIEF DESCRIPTION OF DRAWINGS

This and other characteristics of the present invention shall become readily apparent from the following description of a preferred embodiment, provided purely by way of non limiting example with the aid of the accompanying drawings, in which.

SPECIFIC DESCRIPTION

Figure 1:
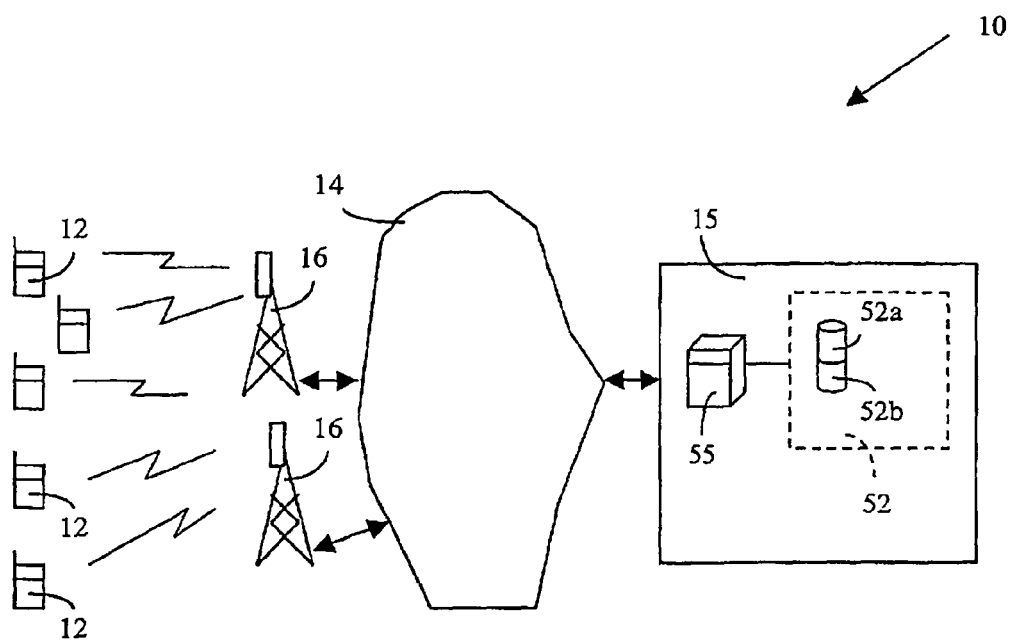
FIG. 1 is a diagram of the locating system according to the invention.

With reference to FIG. 1, the system 10 for identifying the position of mobile terminals, according to the invention, comprises a multiplicity of mobile terminals (terminals) 12, for instance cellular telephones randomly distributed on a determined territory and whose positions are to be identified, a network 14 for mobile or cellular telephony with a plurality of base radio stations (Btn stations) 16, for instance a GSM (Global System for Mobile communications) network, and a reference station or reference or cellular phone locating center (MLC) 15.

Figure 2:
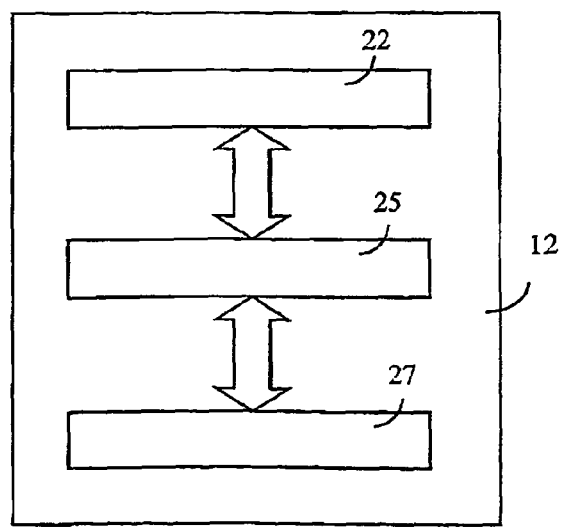
FIG. 2 shows a generic block diagram of a mobile terminal of the system of FIG. 1.

Each terminal 12 (FIG. 1 and FIG. 2), of a known type, comprises a radio frequency circuit 22, a control circuit 25 connected to the RF circuit 22 and able to control the activities of the terminal 12, based on programs stored in the control circuit 25 itself, and a SIM card 27, connected in known fashion to the control circuit 25. The SIM 27, of a known type, comprises appropriate programs both to manage and charge the telephone traffic and, as shall be described in greater detail hereafter, to allow locating the terminal 12 itself, for instance under idle state conditions.

The control circuit 25, as is well known, is able, in particular, to measure, periodically and by means of the RF circuit 22, values of electromagnetic field (RF measurements) within a determined number of frequency channels (channels) and to select among the channels a maximum number of RF measurements, for instance up to 7 in the case of GSM, corresponding to an equal number of channels from which the terminal 12, depending on the specific construction characteristics, is able to decode a respective identifying code, for example the CGI code of the serving station or cell and/or the ARFCN (Absolute Radio Frequency Channel Numbers) and BSIC (Base Station Identity Code) codes.

The SIM 27, in accordance with the present invention, is able, with appropriate program modules provided by a telephone operator or by a manager of the center MLC 15 and able to be activated by a user of the terminal or by an authorised operator, to command the control circuit 25 to perform a predetermined number of RF measurements and to transfer to the SIM 27 itself the measurements and/or parameters obtained, and it is able to transmit the measurements and/or the parameters, for instance in the form of SMS (Short Messages), to the MLC center 15.

For instance, in accordance with a preferred embodiment, the SIM 27 comprises program modules able to command the terminal 12 to perform the functions described below.

Figure 3:
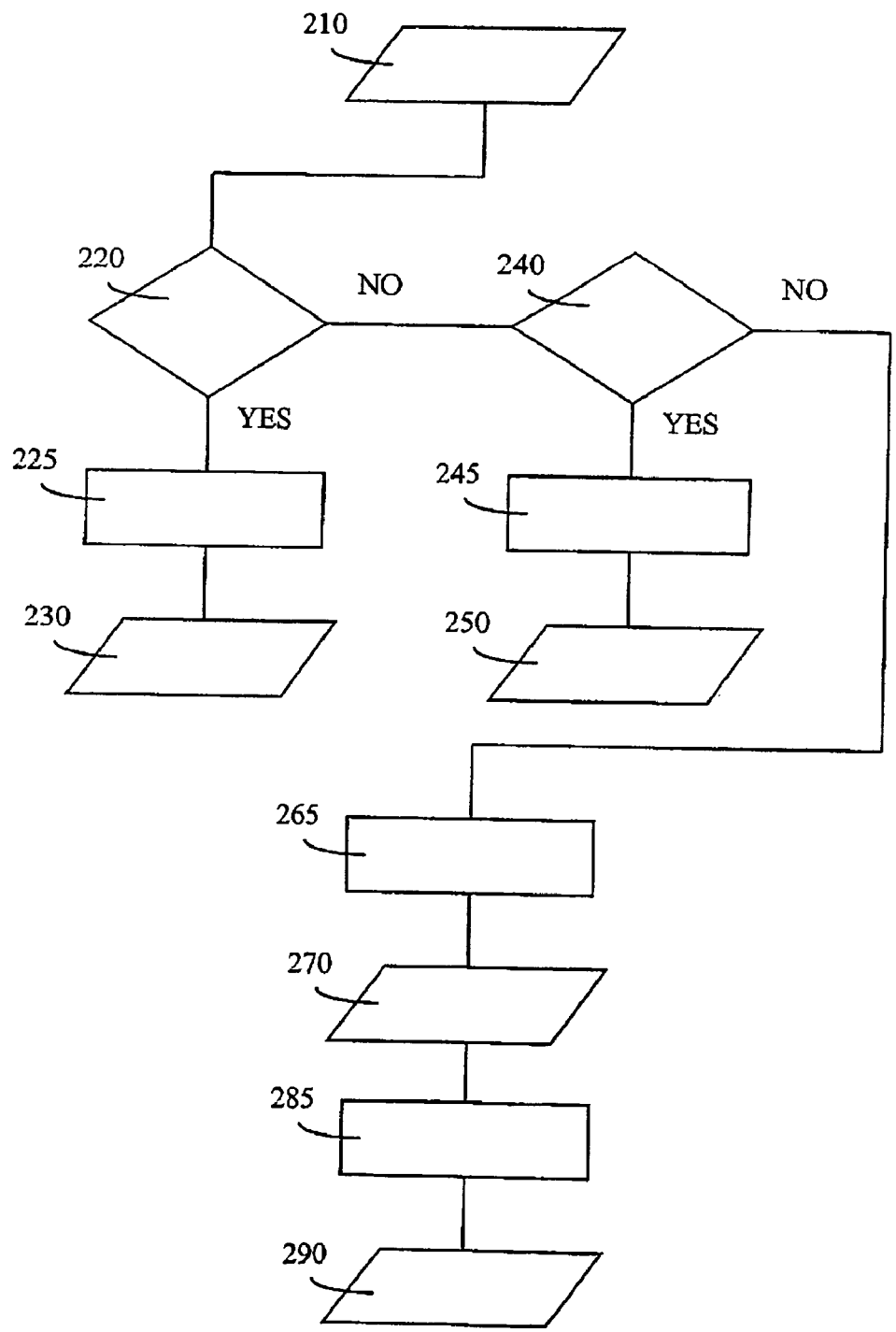
FIG. 3 shows an operation diagram relating to the mobile terminals of the system of FIG. 1.

In a first step of activation of locating functions 210 (FIG. 1, FIG. 2 and FIG. 3), given an activation command received, for example, from the control circuit 25, the SIM 27 activates the program module able to allow to generate and transmit to the MLC center 15 the parameters necessary to locate the terminal 12.

In an immediately subsequent step of checking the characteristics of the terminal (initial check) 220, the SIM 27 verifies, with the aid of the control circuit 25, the characteristics of the terminal 12.

If, as a result of the initial check 220, the terminal 12 is found to have such characteristics as to be able to interpret and manage only information about the serving cell (affirmative case), the SIM 27 activates, in sequence, a step of obtaining the identifying code of the serving cell (obtaining CGI) 225 and a step of transmitting to the MLC center 15 an SMS message containing the location request and only the CGI code of the serving cell (CGI transmission) 230.

The MLC center 15 will proceed with locating the terminal 12, as will be described in detail hereafter, starting from the type of information thus received.

If, as a result of the initial check 220, the terminal 12 is found to have such characteristics as to be able to interpret and manage electromagnetic field levels (RF levels) relating to several BTS stations 16 of the network 14 (negative case), the SIM 27 proceeds with a step of additionally checking the characteristics of the terminal (checking terminal level) 240 to verify whether the terminal 12 has characteristics limited only to the interpretation and management of the RF levels of the serving cell and of the cells adjacent to the serving cell.

If this limitation exists (affirmative case), the SIM 27 activates, in sequence, a step of obtaining RF measurements and corresponding cell codes (obtaining RF measurements) 245 and a step of transmitting to the MLC center 15 an SMS message containing the location request, the cell codes and the RF measurements (transmitting RF measurements) 250.

The MLC center 15 will proceed to locate the terminal 12, as will be described in detail hereafter, starting from the type of information thus received.

If, as a result of the step of checking the terminal level 240, the terminal 12 is found to have such characteristics as to be able to manage, in addition to the RF levels, also other parameters, in particular according to the present embodiment the TA (Time Advance) parameter (negative case), the SIM 27 activates in sequence:

a step of obtaining RF measurements and corresponding cell codes 265;

a step of transmitting to the MLC center 15 a first SMS message containing the location request, the cell codes and the RF measurements (transmitting RF measurements) 270;

a step of obtaining the parameter TA (285) following a known information exchange between the terminal 12 and the serving station BTS 16; and a step of transmitting to the MLC center 15 a second SMS message containing the parameter TA (transmitting the parameter TA) 290.

Following this sequence of steps the MC center 15 will proceed with locating the terminal 12, as will be described in detail hereafter, staring from the type of information thus received with the SMS messages.

Therefore, on the basis of the modules stored for instance in the SIM 27 and executed thereby, it is possible, according to the present invention, to sent to the MLC center 15 information and parameters having a diversified information content and able to allow, as will be described in detail hereafter, to locate the mobile terminals 12.

The network 14, of a known type, for instance the GSM network, is able to exchange, by means of the BTS stations 16, control information both under busy state and idle state conditions with the terminals 12 and to transmit, for example to the MLC center 15, the SMS messages containing the measurements and/or the parameters necessary for the locating operation.

In general, the network 14 is able to allow the exchange of messages and communications between the terminals 12, present in elementary territory elements or pixels, and service centers such as the MLC center 15.

The MLC center 15 comprises, in a preferred embodiment, an electronic computer (computer) 55, of known type, for instance a Pentium® III with dual CPU with 512 Mbytes internal RAM memory and Windows® NT operating system and a known subsystem of disks (disk) 52, connected to the computer 55 and able to store, for instance in a first zone 52a, reference data bases and, in a second zone 52b, processing or program modules to be used to identify the position of the terminals 12.

The MLC center 15, as will be described in detail hereafter, is able to identify, by means of the processing modules stored in the zone 52b and based on the SMS messages received from the terminals 12 and on the reference data bases stored in the zone 52a, the position of the terminals 12 and to transmit the position information thus obtained to authorised service centers and/or to the terminals 12 themselves, for example through the network 14.

The reference data base (data base) stored in the zone 52a of the disk 52 comprises a set of information rows (records) whose number equals, for instance, the number of cells covering the territory whereon the center MLC 15 is authorised to perform the locating operation; each record of the data base comprises, for instance, the following fields:

CGI field—contains the cell identifier code, which code is, as will be readily apparent to a person versed in the art, a primary key for accessing the data base since each cell is bi-univocally identified by the associated CGI;

Cell Position or Site field—contains the geographic coordinates, for instance in latitude and longitude, of the BTS station 16 whereto the cell is associated;

Antenna Characteristics field—contains information about the antenna and the corresponding radiating apparatus, such as:

antenna orientation;

altitude above sea level of the ground whereon the antenna is positioned;

height of the antenna referred to the ground;

power irradiated by the antenna;

losses of the radiating apparatus;

type of antenna or corresponding identifier code whereto is associated, as will be readily apparent to a person versed in the art, a specific form of radiation diagram;

centroid of the cell (this field, according to the present embodiment, is optional).

Secondary Cell Identifier field—contains a secondary key associated to the cell which, although it does not identify the cell in bi-univocal fashion, allows, as will be readily apparent to a person versed in the art, to identify with certainty, among a plurality of cells having tie same Secondary Identifier, the cells adjacent to the cell serving the terminal 12 to be located; in particular, the field, in accordance with the present embodiment, contains ARFCN code (also called BCCHNO Broadcast Control Channel Number) which shows the number corresponding to the frequency of the BCCH channel which, as is well known, carried the control information of the cell;

BSIC code, also called cell color code which, associated with the ARFCN code, allows to identify a limited number of cells present on the territory, generally not adjacent ones.

The processing modules, stored in the zone 52b of the disk 52, comprise a determined number of locating engines, for instance, according to the embodiment described herein, three locating engines, respectively able both to process the different types of information coming from the terminals 12 and to determine the position of the terminals 12 themselves and the locating accuracy.

For the sake of description completeness, it is specified that locating accuracy is meant here as the 0.67 percentile of the derived locating error and that such accuracy is obtained, for instance, experimentally given the locating results derived by the respective locating engines.

In other terms, the locating accuracy, in accordance with the present invention, is determined on each occasion by the respective locating engines assuming that in 67% of the cases the effective locating error is smaller than the value of accuracy obtained.

The processing modules also comprise a controlling or coordination module able to coordinate the locating functions of the MLC center 15 selectively activating, as shall be described in detail hereafter, the locating engines as the type and quality of information received or stored in the reference data base change.

A first locating engine (CGI engine) is able, for example, to identify the position of the mobile terminals 12 and the corresponding positioning accuracy given locating request containing information about the CGI code of the serving cell alone.

the CGI engine uses, in particular, the "cell centroid" information stored in the reference data base and assigns, for example, the pixel corresponding to the "cell centroid" as the position of the terminal 12.

For the sake of completeness, it is specified that the "cell centroid" in addition to a value stored in the data base of the MLC center 15, can also have a value computed dynamically given specific locating requests.

The calculation of the "cell centroid", which is considered of a new type with respect to the prior art, is conducted by carrying out an analysis of the arrangement of the cells adjacent to the serving cell and obtaining, given this analysis, an estimate of the shape of the cell and of its centroid.

In particular, according to the present embodiment the "cell centroid" is computed, based on the information present in the data base, in the following way:
identifying the BTS station 16 that is closest to the serving cell and does not stand on the same site;
determining the distance "d" between the identified BTS station and the serving cell;
assigning the position of the "cell centroid" to the pixel having direction of orientation of the antenna of the serving cell and distance equal to "d/2".

In addition to providing the "cell centroid" as an estimate of the position of the terminal 12, the CGI' engine provides, in accordance with a further characteristic of the present invention, the value of the accuracy of the locating operation conducted.

In particular, the accuracy provided by the CGI engine is calculated as a linear function of the distance "d" according to an expression of the type:

$$e_{CGI}=K_1*d+K_2$$

in which $e_{CGI}$ represents the accuracy computed with the CGI engine;

$K_1$ represents numerical coefficients, smaller than 1, obtained experimentally on the basis of field measurements;

$K_2$ represents terms obtained experimentally on the basis of field measurements.

For instance, it was verified that, using the locating methodology described above, K1 takes on a value of X and K2 takes on a value of 0.

A second locating engine (RF engine) is able, for example, to identify the position of the mobile terminals 12 and the corresponding accuracy as a result of the locating requests containing information only about the RF measurements made by the terminal 12.

Figure 5A:
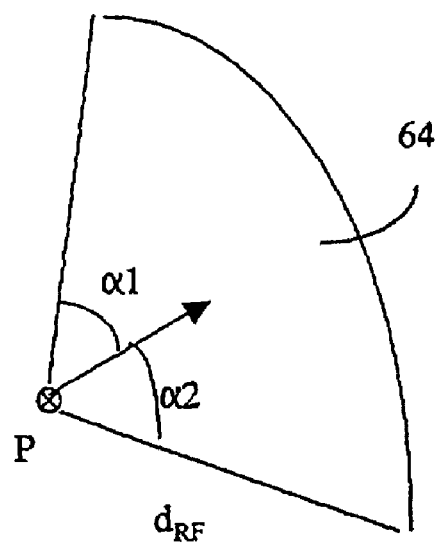
FIG. 5a shows a type of locating area or search area obtainable by means of the system of FIG. 1.

The identification of the position of the mobile terminal 12 by the RF engine, which is considered of a new type with respect to the prior art, is performed in the following way:
delimiting, based on the information present in the data base of the MLC center 15 about the serving cell, an area of possible location or search area of the terminal 12 constituted, in this case, by a circular sector 64 (FIG. 1, FIG. 5*a*) in which:
the reference P indicates the position of the serving BTS station (serving BTS);
the arrow indicates the direction of orientation of the antenna of the serving BTS;
the angular references a1 and a2 are equal and have a value determined experimentally, for instance 45 degrees in the case of directional antennas and 180 degrees in the case of omnidirectional antennas;
the "$d_{RF}$" radius of the circular sector is calculated in the following manner:
determining, based on the information present in the data base about the adjacent cells that do not stand on the same site of the serving cell, the distances "$d_i$" from the serving BTS of the monitored BTS stations (whereof the MLC center 15 has received the RF measurements);
assigning to the radius "$d_{RF}$" the minimum value between the distances "$d_i$" thus determined; if "$d_{RF}$" is found to have a value exceeding a predetermined maximum value, for instance 30 km, the radius is assumed to be equal to the predetermined value;
calculating for each pixel "Q" of the search area thus determined a vector $E_i(Q)$ in the following way:

$$E_i(Q)=PRM_i-PR_i(Q)$$

in which:
i is an index ranging from 0 to n, the index 0 refers to the serving cell, the indices from 1 to n refer to the cells adjacent to the serving cell and whereof the MLC center 15 has received and used the RF measurements:
$PRM_i$ is the value of the RF measurement, called RXLEV in the case of GSM networks, present in the measurements record of the terminal 12, used by the MLC center 15 and relating to the cell i;
$PR_i(Q)$ is the value of the power which a terminal 12 would receive from a station BTS 16 with index i in the pixel Q calculated according to a known propagation model, for example the model called, in the literature, RASPUTIN;
assigning to the terminal 12 the position corresponding to the minimum value of the following f(Q) function, calculated for/each pixel Q of the determined search area:

$$f(Q)=\sigma(Q)-r(Q)$$

in which:
$\sigma(Q)$ is the standard deviation calculated on the basis of the vectors $E_i(Q)$; and
r(Q) is the average of the values of the powers $PR_i(Q)$ normalized so that $\sigma(Q)$ and r(Q) itself have the same average and same variance in the pixels Q of the determined search area.

The function $f(Q)$ above, determined experimentally, represents one of the possible ways to identify the position of the terminals 12 using the measurements and the parameters transmitted by the terminal 12 itself, for example under idle state conditions, and the field measurements predictable according to the information stored in the reference data base.

The locating accuracy $e_{RF}$ is calculated by the RF engine in the following way:
determining, according to the number of BTS stations whose RF measurements have been received and used, a geometric figure, for example a square with side "X", containing the BTS stations;
calculating the RF accuracy as a polynomial function of the side "X".

For example the accuracy $e_{RF}$ can be determined as a fifth degree polynomial function of the value of the side "X" whose coefficients are determined experimentally 'following a multiplicity of locating measurements whereof the position of the terminal, i.e. the unknown variable, is known, as will be readily apparent to a person versed in the art.

A third locating engine (engine TA) is able, for example, to identify the position of the mobile terminals 12 and the corresponding accuracy eTA following the locating requests containing information about the RF measurements and the parameter TA.

Figure 5B:
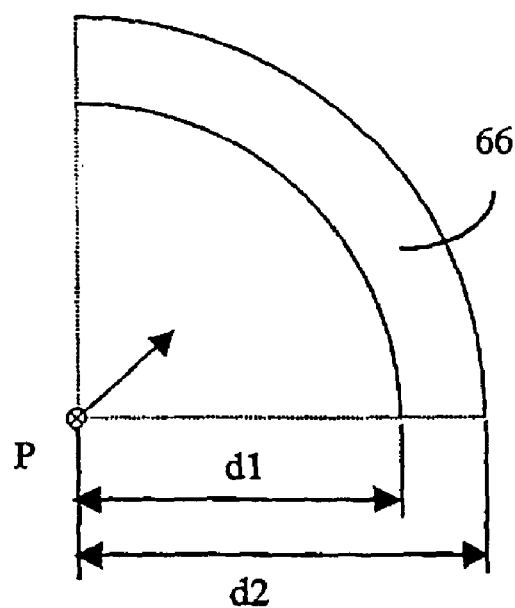
FIG. 5b shows an additional type of locating area or search area obtainable by means of the system of FIG. 1.

To identify the position of the mobile terminal 12, the engine TA proceeds as follows:
delimiting, based on the information present in the data base of the MLC center 15 and relating to the serving cell, an area of possible location of the terminal 12 or search area of the terminal 12 to an angular corona 66 (FIG. 1, FIG. 5*b*) in which:

the reference P indicates the position of the serving BTS stations (serving BTS);

the arrow indicates the direction of orientation of the, antenna of the serving BTS;

the angular opening of the corona has a value determined experimentally, for example 90 degrees in the case of directional antenna and 360 degrees in case of omnidirectional antennas;

d1 and d2 are determined on the basis of the values of the "k" parameters relating to TA transmitted by the terminal 12 to the MLC center 15 as set out in the following table 1.

TABLE 1

| TA (k) | d1 (meters) | d2 (meters) |
|---|---|---|
| 0 | 101 | 601 |
| 1 | 201 | 901 |
| 2 | 401 | 1401 |
| k > 2 | 542 * k − 429 | 542 * k + 571 | calculating and assigning the position of the terminal 12 in a manner equivalent to the one previously described for the RF engine, but using, in this case, as the search area the angular corona 66 thus determined.

The locating accuracy $e_{TA}$ is calculated by the engine TA by means of a linear function of the parameter TA transmitted by the mobile terminal 12 to the MLC center 15.

This simplification is intuitively understandable, since the higher the parameter TA, the more extended the search area and, consequently, the error that the locating engine TA can make.

In particular, the accuracy $e_{TA}$ of the engine TA is calculated as a linear function of the parameter TA according to an expression of the following kind:

$$e_{TA}=C1*TA+C2$$

in which:

TA is the numeric value from 0 to k transmitted by the terminal 12; and C1 and C2 are two constants determined experimentally.

For instance, it has been verified that, using the described locating methodology, the values of the constants C1 and C2 are equal at about 200 meters.

Figure 4:
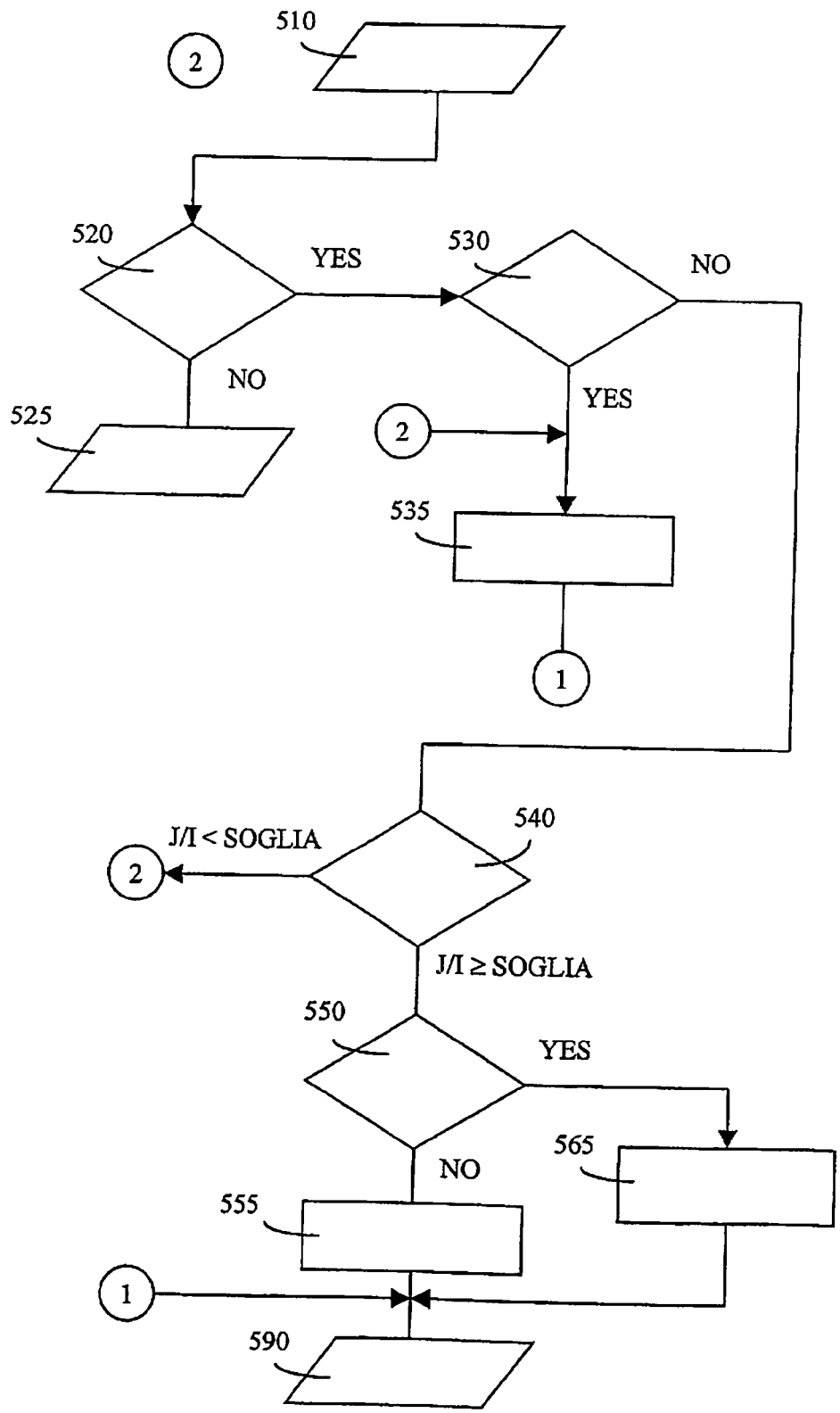
FIG. 4 shows an operation diagram relating to the system and method according to the invention.

The operation of the locating system according to the invention is described hereafter with reference to FIG. 4.

In a first step (activating the location operation) 510, given one or more SMS messages transmitted, for example, from one of the terminals 12 (FIG. 1, FIG. 4) and containing the location request, the computer 55 activates, for instance, the co-ordination module stored in the disk 52, in order to start the procedure for actually locating the terminal 12.

In a subsequent verification step (verifying presence of CGI code) 520, the computer 55 of the MLC center 15 verifies, for instance by means of the co-ordination module, whether among the information transmitted is present the identifier CGI code of the cell serving the mobile terminal 12.

If the CGI code is not present (negative case), the computer 55 activates a step for the transmission of an error message 525 to the terminal 12 or to the center requesting the location, to indicate the impossibility of performing the locating operation.

If the CGI code is present (affirmative case), a step is activated of further verifying the information received (verifying the presence of the CGI alone) 530.

If the transmitted information contains the CGI code alone (affirmative case), the computer 55 activates the step of computing the location and accuracy 535 of the CGI engine, as described, and, upon its completion, the step of transmitting the location and accuracy information 590, for example to the terminal 12 or to the requesting center.

If the step of verifying the presence of the CGI alone 530 shows that information about cells adjacent to the serving cell are present as well (negative case), the computer 55 proceeds with a step of verifying the reliability of the transmitted information 540.

In this step 540, considered an additional characteristic element of the present invention, the computer 55 checks the number and the content of the transmitted information (cell information), in particular the codes ARFCN and BSIC, and compares them with the information present in the data base contained in the disk 52 to identify the CGI codes of the cells adjacent to the serving cell.

During the checking or verifying step 540, if the computer 55 verifies that some cell information are not consistent, for instance do not correspond to cells adjacent to the serving cell, then the computer discards the inconsistent cell information as unreliable and retains only the cell information considered reliable.

The checking step 540, as will be readily apparent to a person versed in the art, allows one to verify both the content of transmitted cell information and the content of the information in the data base.

Given the ratio between the number of cell data items considered reliable (J) and the number of cell data items transmitted (I), the computer performs, alternatively, the following steps.

If the J/I ratio is, for instance, lower than a predetermined threshold, for instance a threshold of 50%, the computer 55 considers the information unreliable and activates in sequence the location and accuracy computing step 535, using the CGI engine and operating as if the cell information had not arrived, and the step of transmitting the location and accuracy information 590.

If the ratio J/I is, for example, equal to or greater than the predetermined threshold, the computer 55 considers the information reliable and activates an additional verification step (verification of the presence of TA) 550.

The verification of the presence of TA 550 is made in order to select in alternative fashion, respectively the RF engine or the TA engine described above.

In particular, if the parameter TA has not been transmitted (negative case), the computer 55 activates the step of computing the location and accuracy 555 of the RF engine, as described, and, upon its completion, the step of transmitting the location and accuracy information 590, for example, to the terminal 12 or to the requesting center.

If the parameter TA has been transmitted (affirmative case), the computer 55 activates the step of computing the location and accuracy 565 of the TA engine, as described, and, upon its completion, the step of transmitting the location and accuracy information 590.

Therefore, by means of the set of steps described and on the basis of the proposed architecture, the system 10 according to the invention is able to allow to locate the mobile terminals according to the characteristics of the terminals 12 themselves, to the quality of the information received and to that of the information present in the reference data base.

The invention has been described taking as a reference measurements transmitted by the terminals 12 to the MLC center 15 using SMS messages.

Naturally, the characteristics of the system and of the method described do not vary in case of different modes for transmitting the information or if the information is transmitted directly by the network, also under busy state conditions.

The invention has been described taking as a reference three locating engines and as many types of information provided by the terminals.

Naturally, the number of engines and the types of information could be different from those described without thereby modifying the inventive aspect of using in alternative fashion or, possibly, in complementary fashion mutually diversified information and locating engines.

Obvious modifications or variations to the above description are possible, in the dimensions, shapes, materials, components, circuit elements, connections and contacts, as well as in the details of the circuitry and of the construction illustrated herein and of the operating method without thereby departing from the spirit of the invention as set out in the claims that follow.

The invention claimed is:

1. A reference center for identifying the position of mobile terminals in a network, the reference center comprising:
   a network interface for receiving information associated with at least one of the mobile terminals in the network; and
   one or more processing modules for determining a position of the at least one mobile terminal based on the information received at the network interface, the one or more processing modules comprising:
      a plurality of locating engines each configured to use a different respective procedure for determining a position of the at least one mobile terminal in the network, wherein at least one of the plurality of locating engines determines an accuracy value corresponding to the position of the at least one mobile terminal; and
      a coordination module for selectively activating a particular one of the plurality of locating engines based on the contents of the information received at the network interface and the accuracy value.

2. The reference center defined in claim 1 wherein the one or more processing modules further comprise:
   at least one module for verifying the contents of the information received at the network interface.

3. The reference center defined in claim 1 wherein the plurality of locating engines includes a first locating engine that determines a cell centroid position using an identifying code received at the network interface.

4. The reference center defined in claim 1 wherein the plurality of locating engines includes a second locating engine that determines the position of a mobile terminal using at least a radio frequency (RF) measurement.

5. The reference center defined in claim 4 wherein the second locating engine determines the position of the mobile terminal within an angular sector having dimensions determined on the basis of RF measurements and of reference data regarding network equipment able to serve the mobile terminals in a determined territory.

6. The reference center defined in claim 1, wherein the plurality of locating engines includes a third locating engine that determines the position of a mobile terminal using at least a radio frequency (RF) measurement and a time advance (TA) parameter.

7. The reference center defined in claim 1, wherein the at least one mobile terminal comprises a mobile telephone.

8. A method for identifying the position of mobile terminals in a predetermined territory, the method comprising:
   receiving information associated with at least one of the mobile terminals in the predetermined territory;
   selecting a particular locating engine from a plurality of different locating engines, each of the plurality of locating engines configured to use a different respective procedure for determining a position of the at least one mobile terminal,
      wherein at least one of the plurality of different locating engines determines an accuracy value corresponding to the position of at least one of the mobile terminals, and
      wherein selecting a particular locating engine is based on the contents of the received information and the accuracy value; and
   using the selected locating engine to determine a position of the at least one mobile terminal in the predetermined territory.

9. The method defined in claim 8, further comprising the step of:
   verifying the contents of the information associated with the at least one mobile terminal on the basis of reference data regarding network equipment able to serve the mobile terminals in the predetermined territory.

10. The method defined in claim 8, wherein the step of determining the position of the at least one mobile terminal further comprises:
   determining the position of the at least one mobile terminal based on a cell centroid position associated with the at least one mobile terminal.

11. The method defined in claim 8, wherein the step of determining the position of the at least one mobile terminal further comprises:
   determining the position of the at least one mobile terminal using at least a radio frequency (RF) measurement.

12. The method defined in claim 8, wherein the step of determining the position of the at least one mobile terminal further comprises:
   determining the position of the at least one mobile terminal using at least a time advance (TA) parameter.

13. The method defined in claim 8, wherein the at least one mobile terminal comprises a mobile telephone.

14. A system for identifying the position of mobile terminals in a predetermined territory, the system comprising:
   devices configured to transmit information having a content that depends on the position of the mobile terminals in the predetermined territory and on information-management characteristics of the mobile terminals;
   at least one reference center configured to process the transmitted information for the purpose of identifying the position of the mobile terminals in the predetermined territory, the reference center comprising:
      a plurality of locating engines each configured to use a different respective procedure for determining a position of at least one of the mobile terminals in the predetermined territory, wherein at least one of the plurality of locating engines determines an accuracy value corresponding to the position of at least one of the mobile terminals;
      a module configured to selectively activate a particular one of the plurality of locating engines based on the contents of the information transmitted by the devices and the accuracy value.

15. A computer-implemented method for identifying the position of mobile terminals in a network, the method comprising:
   determining an accuracy value corresponding to the position of at least one mobile terminal;
   selecting a particular locating engine from a plurality of different locating engines based on information associated with at least one of the mobile terminals and the accuracy value, each of the plurality of locating engines configured to use a different respective procedure for determining a position of the at least one mobile terminal; and determining the position of the at least one mobile terminal using the selected locating engine.

* * * * *